United States Patent
Ongaro

[11] Patent Number: 6,079,090
[45] Date of Patent: Jun. 27, 2000

[54] NUMERIC-CONTROL MACHINE TOOL FOR TURNING AND HOBBING MECHANICAL PARTS

[75] Inventor: Stefano Ongaro, Susegana, Italy

[73] Assignee: Nuova Trasmissione S.r.l., Susegana, Italy

[21] Appl. No.: 08/933,881

[22] Filed: Sep. 19, 1997

[30] Foreign Application Priority Data

Sep. 26, 1996 [IT] Italy .................................. MI96A1973

[51] Int. Cl.⁷ .............................. B23Q 3/02; B23B 29/32; B23F 5/22
[52] U.S. Cl. ................................ 29/27 C; 29/40; 82/121; 409/11
[58] Field of Search .................................. 29/27 C, 27 R, 29/35.5, 40, 39; 82/129, 120, 121, 159; 409/16, 11, 15; 483/18

[56] References Cited

U.S. PATENT DOCUMENTS

| | | | |
|---|---|---|---|
| 3,643,307 | 2/1972 | Ledergerber et al. | 82/129 X |
| 3,685,111 | 8/1972 | Nemoto | 29/27 R |
| 4,543,020 | 9/1985 | Shtipelman | 29/26 R X |
| 5,205,806 | 4/1993 | Ishida et al. | 483/18 |
| 5,490,307 | 2/1996 | Link | 29/27 C |
| 5,885,199 | 3/1999 | Shao | 483/19 |

FOREIGN PATENT DOCUMENTS

| | | | |
|---|---|---|---|
| 0 538 515 | 4/1993 | European Pat. Off. | |
| 56337 | 5/1981 | Japan | 409/16 |
| WO96/24456 | 8/1996 | WIPO | |

*Primary Examiner*—William Briggs
*Attorney, Agent, or Firm*—Guido Modiano; Albert Josif

[57] ABSTRACT

A numeric-control machine tool for turning and hobbing mechanical parts, comprising: a main mandrel, which is provided with grip means for a mechanical part and can be rotated about its own axis; a first carriage, which supports a turret tool post for turning and/or milling and/or drilling; and a second carriage, which supports a gear hobbing tool head. The first and second carriages can move on command, in a controlled manner, with respect to the main mandrel in order to selectively move the tools installed on the turret tool post and the hobbing tools so that they machine the part supported by the main mandrel.

13 Claims, 2 Drawing Sheets

NUMERIC-CONTROL MACHINE TOOL FOR TURNING AND HOBBING MECHANICAL PARTS

BACKGROUND OF THE INVENTION

The present invention relates to a numeric-control machine tool for turning and hobbing mechanical parts.

In order to produce mechanical parts which require both turning and hobbing it is currently necessary to use two separate machine tools, i.e., a lathe, whereby it is possible to turn, mill and drill the part, and a gear hobbing machine solely for hobbing.

In practice, the mechanical part is generally subjected mainly to turning, in preparation for hobbing, on the lathe, and is then removed from the lathe and placed on the main mandrel of the gear hobbing machine.

In many cases, after hobbing it is necessary to perform further machining with machine tools, for example to deburr and/or chamfer the set of teeth, to form axial and/or radial external grooves, radial threads, cams, etcetera. In such cases, it is necessary to perform an additional transfer of the mechanical part from the gear hobbing machine to another machine tool.

The operation for transferring the mechanical parts from one machine tool to the other significantly affects the time requirements and therefore the overall costs of machining.

Moreover, the part must be positioned on each machine tool with high precision in order to comply with design tolerances.

Transfer of the mechanical part from one machine tool to another is even more complicated to perform when the subsequent machining must be performed in relation to a specific angular position of the part about its own axis, in a technique known as phase matching.

Modern machining lines include specifically provided robotized pick-and-place units, even of the numeric-control type, which transfer the parts from one machine tool to another.

However, these devices are extremely complicated and significantly affect the investment costs of the system.

Another problem arising from the need to use a lathe and a gear hobbing machine is certainly constituted by the overall purchase cost of these machine tools and by the space required in the workplace, which are an additional burden in terms of investment and running costs.

Another problem that arises from the combined use of a lathe and of a gear hobbing machine is the need to provide for a storage area for the parts to be hobbed between the lathe and the gear hobbing machine.

SUMMARY OF THE INVENTION

The aim of the present invention is to solve the above problems by providing a numeric-control machine tool which is capable of turning and hobbing without requiring transfer of the mechanical part being machined.

Within the scope of this aim, an object of the present invention is to provide a machine tool which, by avoiding the transfer of the part during intermediate steps of machining, allows to achieve much more precise machining than obtainable by using a conventional lathe and gear hobbing machine.

Another object of the present invention is to provide a machine tool which requires, for an equal production capacity, a much smaller installation space than required to install a lathe and a gear hobbing machine.

Another object of the present invention is to provide a machine tool which, by being able to finish the parts being machined, allows to reduce the entire machining cycle for each individual part, allowing better concurrency in the overall machining cycle.

This aim, these objects and others which will become apparent hereinafter are achieved by a numeric-control machine tool for turning and hobbing mechanical parts, characterized in that it comprises: a main mandrel, which is provided with grip means for a mechanical part and can be rotated about its own axis; a first carriage, which supports a turret tool post for turning and/or milling and/or drilling; and a second carriage, which supports a gear hobbing tool head; said first and second carriages being movable on command, in a controlled manner, with respect to said main mandrel in order to selectively move the tools installed on said turret tool post and the hobbing tools so that they machine the part supported by said main mandrel.

BRIEF DESCRIPTION OF THE DRAWINGS

Further characteristics and advantages of the present invention will become apparent from the following detailed description of a preferred but not exclusive embodiment of the machine tool according to the invention, illustrated only by way of non-limitative example in the accompanying drawings, wherein.

DESCRIPTION OF THE PREFERRED EMBODIMENTS

Figure 1:
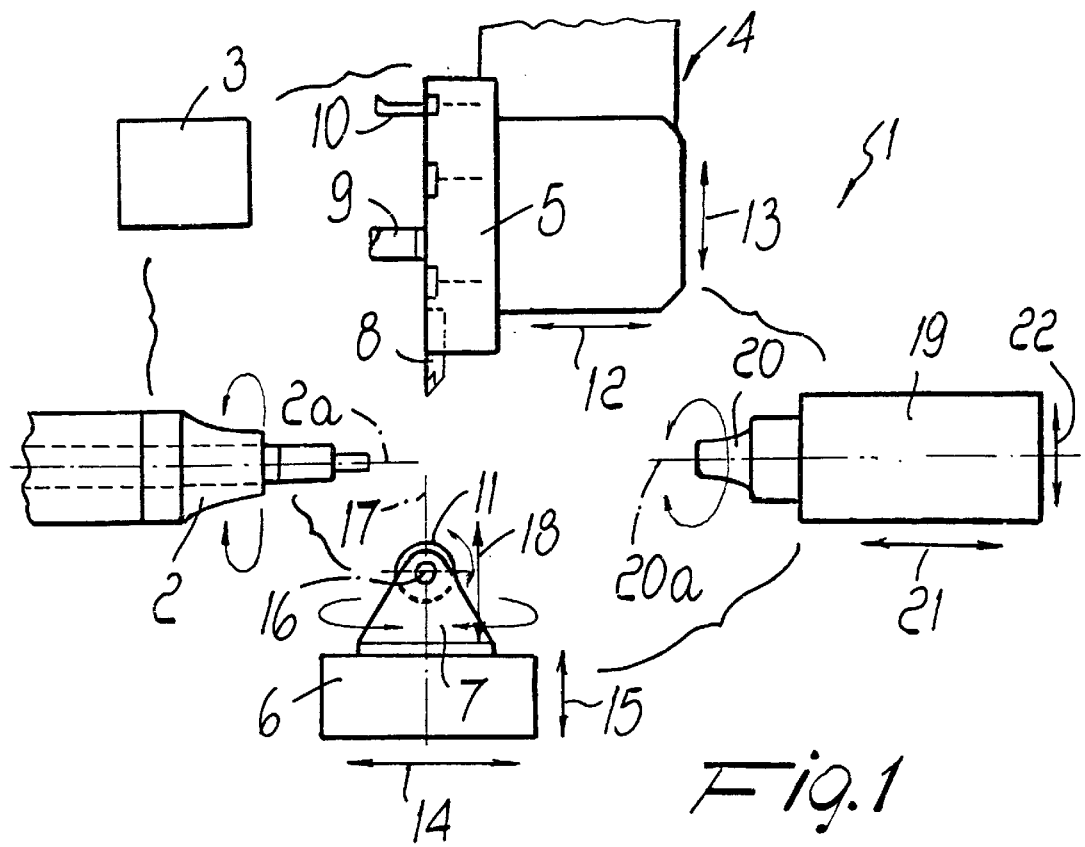
FIG. 1 is a schematic view of the machine tool according to the present invention.

With reference to the above figures, the machine tool according to the invention, generally designated by the reference numeral 1, comprises a main mandrel 2 which has, in a conventional manner, grip means for a mechanical part to be machined; said mandrel can be rotated in a controlled (indexed) manner by a numeric-control unit 3 about its own axis 2a.

The machine tool also comprises a first carriage 4 which supports a turret tool post 5 with a plurality of stations (generally twelve) with turning tools and other tools which are motorized independently to perform drilling and/or milling and/or axial and radial thread cutting, in a manner which is similar to that of turret tool posts of conventional numeric-control lathes (CNC).

According to the invention, the machine tool also comprises a second carriage 6, which supports a hobbing tool head 7.

The first carriage 4 and the second carriage 6 can move on command, in a manner which is controlled by the numeric-control controller 3, with respect to the main mandrel 2 in order to selectively move the tools 8, 9, 10 installed on the turret tool post 5 and the hobbing tool 11 installed on the head 7 so that they machine the part 30 supported by the main mandrel 2.

More specifically, the first carriage 4 can move on command along two numeric-control axes 12 and 13 with continuous interpolation: a first axis 12, which is parallel to the axis 2a of the main mandrel 2, and a second axis 13, which is perpendicular to the first axis 12.

The second carriage 6 can also move on command, with respect to the main mandrel 2, along two numeric-control axes 14 and 15 with continuous interpolation: a third axis 14, which is perpendicular to the axis 2a of the main mandrel 2, and a fourth axis 15, which is perpendicular to the third axis 14.

The hobbing tool 11 can be actuated, with a rotary motion which is controlled by the controller 3, about its own axis 16, which constitutes a fifth numeric-control axis.

The head 7, which supports the hobbing tools 11, can rotate on command, again in a manner which is controlled by the controller 3, about a sixth numeric-control axis 17, which is perpendicular to the axis 2a of the main mandrel 2 in order to allow to vary the inclination of the hobbing tool 11 with respect to the axis 2a of the main mandrel 2 according to the gear hobbing requirements, i.e., to vary/adjust the inclination of the helix of the hobbing tool with respect to the angle of the teeth of the gears to be cut with respect to the axis of the part 30.

Moreover, the head 7 can move on command, with respect to the second carriage 6, in a manner which is controlled by the controller 3, along a seventh numeric-control axis 18 which is parallel to the fourth axis 15.

Conveniently, it is possible to provide a third carriage 19 which supports a tailstock 20 which faces the main mandrel 2.

The third carriage 19 can move on command, in a manner which is controlled by the controller 3, along two numeric-control axes with continuous interpolation: a ninth axis 21, which is parallel to the axis 2a of the main mandrel 2, and a tenth axis 22, which is perpendicular to the ninth axis 21.

The tailstock 20 can be constituted, according to the requirements, by an auxiliary mandrel which is provided with means for gripping the part 30 to be machined and can be rotated about its own axis 20a if it is necessary to replace or assist the grip of the part 30 performed by the main mandrel 2, or can be constituted by a tailstock.

The movements of the components of the machine tool according to the present invention along the various numeric-control axes, as a consequence of the operational interconnection ensured by the controller 3, can be mutually synchronized in the desired relation so as to perform, according to a program which is preset in the numeric-control controller 3, the machinings required to produce the part 30.

In particular, the movement of the first carriage 4 and/or of the second carriage 6 is synchronized with the rotation of the main mandrel 2 and/or of the auxiliary mandrel that constitutes the tailstock 20.

The rotation of the auxiliary mandrel about its own axis is also conveniently synchronized with the rotation of the main mandrel 2.

The machine tool can be equipped with devices for unloading the machined part or with other conventional accessories.

Figure 2:
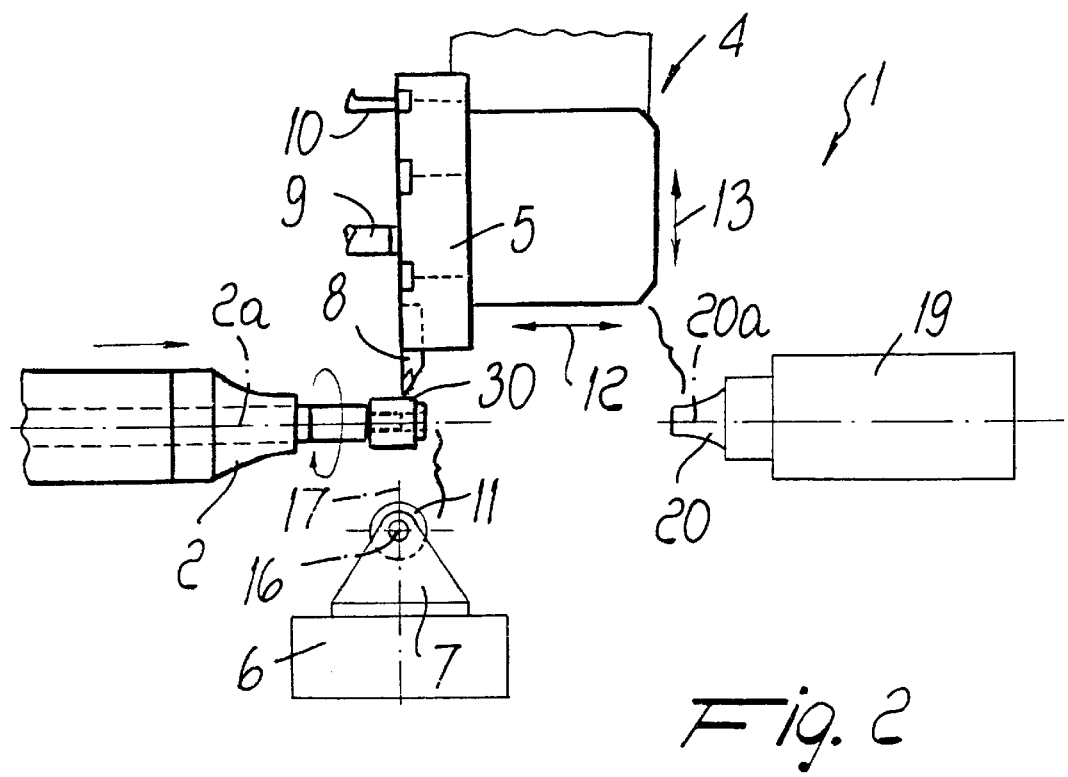
FIGS. 2 to 4 are schematic views of a cycle for the machining of a part which is subjected to turning and gear hobbing with the machine tool according to the invention.
Figure 3:
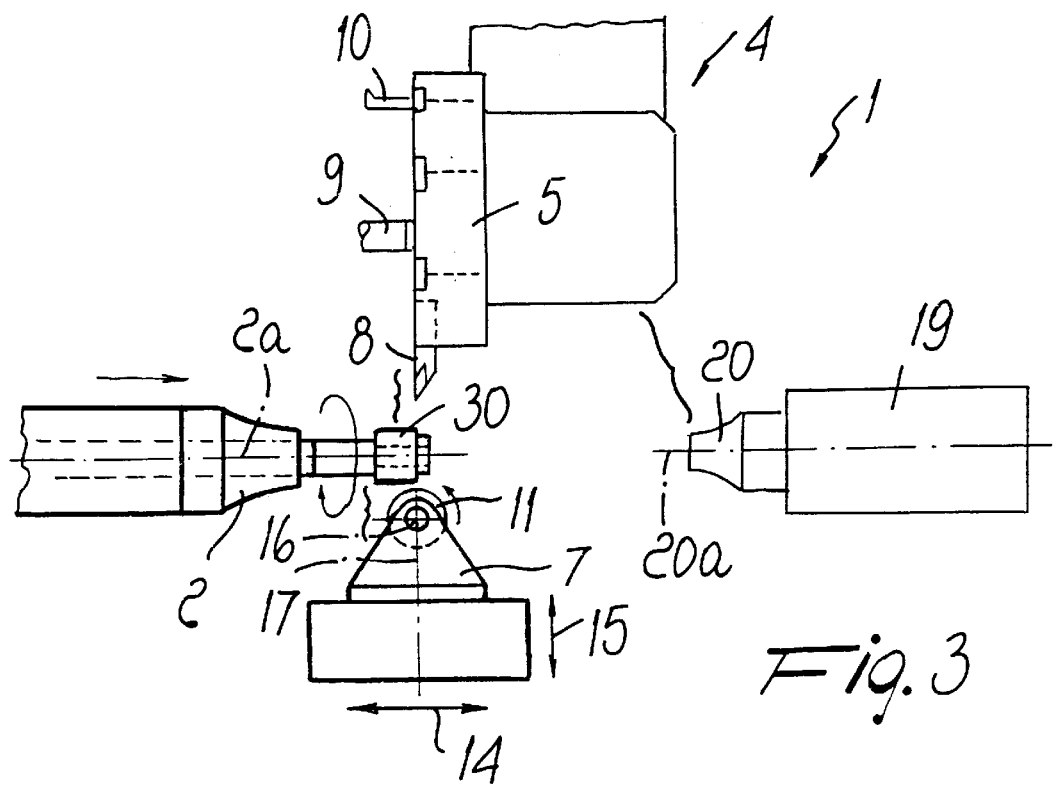
Figure 4:
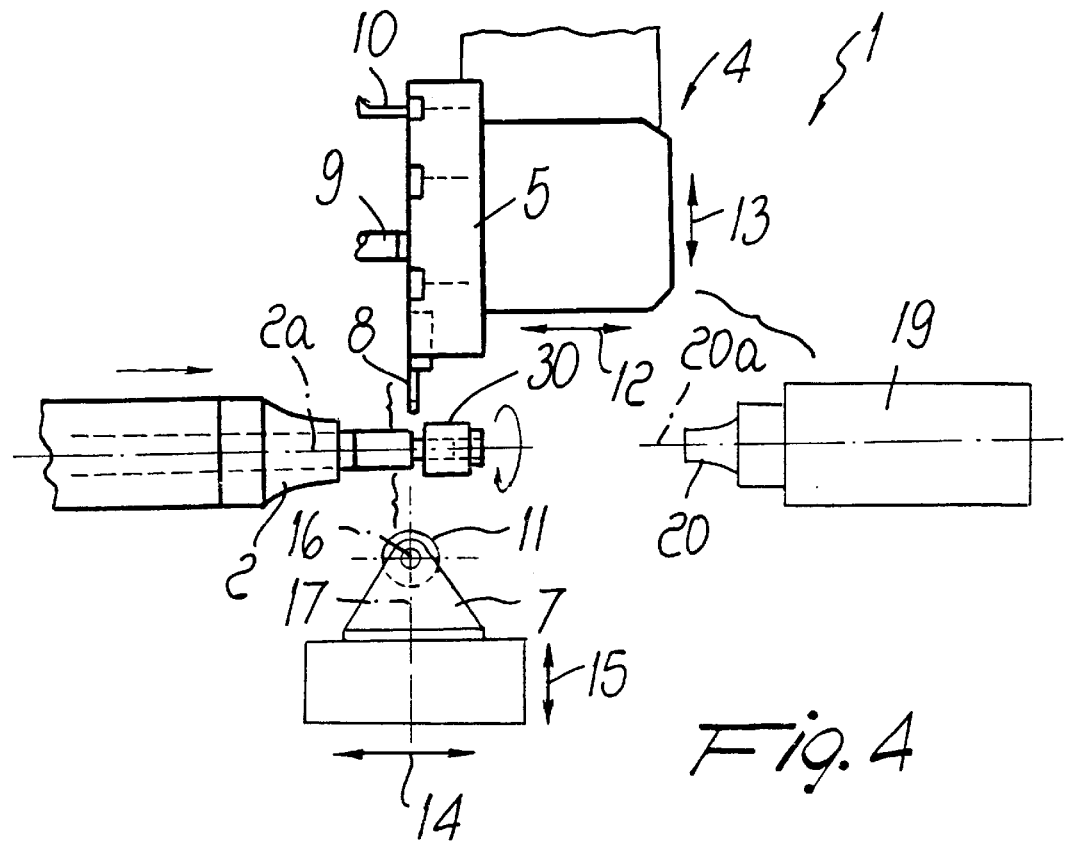

The operation of the machine tool according to the present invention in the production of a part 30 which requires, for example, a first turning step, a second gear hobbing step and a third turning step, with reference to FIGS. 2 to 4, is as follows.

The part 30 to be machined, which is rough-shaped beforehand, is arranged on the main mandrel 2, using the corresponding grip means.

Then, the controller 3 drives the main mandrel 2 with a rotary motion about its own axis 2a and moves the carriage 4 along the axes 12 and 13, performing the turning or milling or drilling of the part 30, according to the tool being used (FIG. 2).

Once the turning operations have been completed without removing the part from the main mandrel 2, the controller 3 moves the first carriage 4 so as to back off the tools of the turret tool post 4 from the part 30 and moves the second carriage 6 along the axes 14 and 15, the head 7 about the axis 17 and along the axis 18, and actuates the hobbing tool 11 so that it rotates about its own axis 16 to perform the gear hobbing of the part (FIG. 3).

It should be noted that among the possible gear hobbing operations, the machine tool according to the present invention is capable of producing, by means of the axial movement of the hobbing tool (shifting), gears which are mutually different, not only in their ratio (two or more gears which differ in number of teeth), but also in terms of tooth shape and pitch, by simultaneously installing two or more hobbing tools on the axis of the head 7.

Finally, if required, the controller 3 can move the second carriage 6 so as to back off the hobbing tool 11 from the part and again move the first carriage 4 to optionally perform further turning operations (FIG. 4).

If required, during the various machining steps the part can be supported or machined by the tailstock 20 by means of the movement of the third carriage 19, which is again actuated by the controller 3, along the axes 21 and 22 and about the axis 20a of the tailstock 20.

Moreover, the carriages 4 and 6 can machine simultaneously by using the hobbing tool together with another tool of the carriage 4, for example to deburr by skimming the part at the region where the hobbing tool reduces its pressure.

The machine tool is also capable of chamfering the gear during gear hobbing.

The machine tool can operate as a "continuous bar" by means of an external bar pusher which continuously feeds commercial bars (3000 mm long). In this case, after machining of the part has ended there is provided a cropping operation performed by a tool, followed by unloading of the part and subsequent protrusion of the bar from the main mandrel, preparing the system to machine the next part.

In practice, it has been observed that the machine tool according to the present invention fully achieves the intended aim and objects, since it is capable of performing turning, milling, drilling and hobbing, avoiding the removal and repositioning of the part on various machining units during intermediate steps of machining.

Accordingly, a considerable reduction in overall machining times is observed; this reduction is even more significant if the machining of a same mechanical part requires maintaining a preset angular position about the axis of the part in passing from one machining to the next, as in the case, for example, of chamferings of the gear and/or in the formation of axial or radial external grooves, radial threads, radial holes, cams or other high-precision machining.

The integrated machining that can be performed with the machine tool according to the present invention allows to obtain fully finished parts whilst reducing the full cycle related to the individual part, considerably shortening the production cycle and thus allowing better concurrency in the overall cycle.

Additional advantages, no less important than those mentioned above, are constituted by the reduced area required by the machine tool according to the present invention, with consequent savings in terms of investment and operation; by the elimination of the need to have a storage area for the parts in intermediate machining conditions; and by a saving in the costs required by the equipment for handling the part in intermediate machining steps.

Moreover, in the case of particularly long parts which require additional support besides that ensured by the main mandrel, during hobbing, the machine tool according to the invention needs no additional gear grip and locking fixtures, which are instead required in conventional machine tools, with drawbacks related to the cost and maintenance of said fixtures.

Another advantage is the higher machining precision achieved with the machine tool according to the present invention, since the part is free from machining errors arising from imperfect positioning of the part in its transfer from one machine tool to another.

Another advantage is that it is possible to use oil in a water-based emulsion as lubricant-coolant, as in a normal lathe, instead of the full mineral oil used in gear hobbing machines, with an additional saving in operating costs.

Another advantage is that it allows considerable economy in terms of labor and energy costs.

The machine tool thus conceived is susceptible of numerous modifications and variations, all of which are within the scope of the inventive concept; all the details may also be replaced with other technically equivalent elements.

In practice, the materials used, as well as the dimensions, may be any according to requirements and to the state of the art.

What is claimed is:

1. A numeric-control machine tool for turning and hobbing mechanical parts, comprising:

a main mandrel, which is provided with grip means for a mechanical part to be worked and is rotatable about its own axis;

a first carriage, which supports a turret tool post for supporting a plurality of selectively usable tools; and a second carriage, which supports a rotatable driven gear hobbing tool head;

said first and second carriages being movable on command along respective horizontal and vertical axes, by means of a controller unit, with respect to said main mandrel in order to selectively move the tools installed on said turret tool post and the hobbing tools so that they machine the part supported by said main mandrel, said first and second carriages being respectively arranged at opposite sides with respect to the mechanical part to be worked, to work both sides of the mechanical part at the same time.

2. The machine tool according to claim 1, wherein said first carriage moves on command by means of said controller unit, with respect to said main mandrel, along two numeric-control axes with continuous interpolation: a first axis, which is parallel to the axis of said main mandrel, and a second axis, which is perpendicular to said first axis.

3. The machine tool according to claim 1, wherein said second carriage is mounted for movement on command by means of said controller unit, with respect to said main mandrel, along two numeric-control axes with continuous interpolation: a third axis, which is parallel to the axis of said main mandrel, and a fourth axis, which is perpendicular to said third axis.

4. The machine tool according to claim 1, wherein the hobbing tool fitted on said hobbing tool head can rotate on command about a fifth numeric-control axis which coincides with the axis of the hobbing tool.

5. The machine tool according to claim 1, wherein said hobbing tool head rotates on command, by means of said controller unit, about a sixth numeric-control axis which is perpendicular to the axis of said main mandrel in order to vary the inclination of the hobbing tool with respect to the axis of said main mandrel.

6. The machine tool according to claim 3, wherein said hobbing tool head moves on command, by means of said controller unit, with respect to said second carriage, along a seventh numeric-control axis which is parallel to said fourth axis.

7. The machine tool according to claim 1, further comprising a third carriage which supports a tailstock which faces said main mandrel and can be rotated about its own axis, which constitutes an eighth numeric-control axis which is parallel to the axis of said main mandrel.

8. The machine tool according to claim 7, wherein said third carriage moves on command, by means of said controller unit, along two numeric-control axes with continuous interpolation: a ninth axis, which is parallel to the axis of said main mandrel, and a tenth axis, which is perpendicular to said ninth axis.

9. The machine tool according to claim 7, wherein said tailstock is constituted by an auxiliary mandrel provided with means for gripping the mechanical part to be machined.

10. The machine tool according to claim 7, wherein said tailstock is constituted by a center.

11. The machine tool according to claim 9, wherein the rotation of said main mandrel and of said auxiliary mandrel about their own axis is controlled continuously.

12. The machine tool according to claim 9, wherein the movement of said first carriage and of said second carriage is synchronized with the rotation of said main mandrel and/or of said auxiliary mandrel by means of said controller unit.

13. The machine tool according to claim 9, wherein the rotation of said auxiliary mandrel about its own axis is synchronized with the rotation of said main mandrel by means of said controller unit.

* * * * *